US010840558B2

(12) United States Patent
Qiu et al.

(10) Patent No.: US 10,840,558 B2
(45) Date of Patent: Nov. 17, 2020

(54) LITHIATION OF ELECTRODES FOR CYLINDRICAL ENERGY STORAGE DEVICES AND METHOD OF MAKING SAME

(71) Applicants: Kathleen Qiu, Hayward, CA (US);
Linda Zhong, Sacramento, CA (US);
Martin Zea, Sacramento, CA (US);
David Kim, Sacramento, CA (US)

(72) Inventors: Kathleen Qiu, Hayward, CA (US);
Linda Zhong, Sacramento, CA (US);
Martin Zea, Sacramento, CA (US);
David Kim, Sacramento, CA (US)

(73) Assignee: LICAP NEW ENERGY TECHNOLOGY (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 16/252,149

(22) Filed: Jan. 18, 2019

(65) Prior Publication Data

US 2019/0237812 A1    Aug. 1, 2019

Related U.S. Application Data

(60) Provisional application No. 62/624,991, filed on Feb. 1, 2018.

(51) Int. Cl.
*H01M 10/0587* (2010.01)
*H01M 4/139* (2010.01)
(Continued)

(52) U.S. Cl.
CPC ........ *H01M 10/0587* (2013.01); *H01G 11/06* (2013.01); *H01G 11/62* (2013.01);
(Continued)

(58) Field of Classification Search
CPC .............. H01L 24/72; H01L 25/071; H01L 2924/10254; H01L 2924/10272;
(Continued)

(56) References Cited

U.S. PATENT DOCUMENTS

2015/0017543 A1   1/2015   Lee et al.
2015/0228969 A1*  8/2015   Cho ........................ C01G 53/50
                                                              429/223
(Continued)

FOREIGN PATENT DOCUMENTS

JP    H08102333 A      4/1994
JP    2008243888       10/2008
(Continued)

OTHER PUBLICATIONS

Florian Holtstiege et al: "Pre-Lithiation Strategies for Rechargeable Energy Storage Technologies: Concepts, Promises and Challenges," Batteries, vol. 4, No. 1 Jan. 23, 2018, p. 4.
(Continued)

*Primary Examiner* — Zandra V Smith
*Assistant Examiner* — Andre C Stevenson
(74) *Attorney, Agent, or Firm* — Stetina Brunda Garred and Brucker; Mark B. Garred

(57) ABSTRACT

A method for lithiation of an electrode includes providing a roll including an electrode to be lithiated, providing a piece of lithium metal with predetermined weight attached to a conductive material, attaching the conductive material to a current collector of the electrode to be lithiated or to a metal tab connected to or from the electrode to be lithiated, placing the roll, the piece of lithium, and the conductive material in a container, and filling the container with an electrolyte containing a lithium salt.

13 Claims, 4 Drawing Sheets

(51) Int. Cl.
*H01M 2/36* (2006.01)
*H01G 11/86* (2013.01)
*H01G 11/70* (2013.01)
*H01G 11/62* (2013.01)
*H01G 11/78* (2013.01)
*H01G 11/06* (2013.01)
*H01M 10/04* (2006.01)
*H01M 4/04* (2006.01)
*H01M 4/36* (2006.01)
*H01G 11/52* (2013.01)
*H01M 10/0585* (2010.01)

(52) U.S. Cl.
CPC ............ *H01G 11/70* (2013.01); *H01G 11/78* (2013.01); *H01G 11/86* (2013.01); *H01M 2/361* (2013.01); *H01M 4/0459* (2013.01); *H01M 4/139* (2013.01); *H01M 4/362* (2013.01); *H01M 10/049* (2013.01); *H01G 11/52* (2013.01); *H01M 10/0585* (2013.01)

(58) Field of Classification Search
CPC ..... H01L 2924/1033; H01L 2924/1203; H01L 2924/13055
See application file for complete search history.

(56) References Cited

U.S. PATENT DOCUMENTS

2015/0263379 A1    9/2015  Xiao et al.
2019/0356014 A1*  11/2019  Abe .................. H01M 10/0569

FOREIGN PATENT DOCUMENTS

JP    2008243888 A    10/2008
JP    2015088437       5/2015

OTHER PUBLICATIONS

Office Action for Japanese Patent Application No. 2019-012586; dated Nov. 28, 2019.
Korean Office Action for Application No. 10-2019-0010304; dated Jun. 28, 2020.
Japanese Office Action for Application No. 2019-012586; dated Jul. 27, 2020.

* cited by examiner

LITHIATION OF ELECTRODES FOR CYLINDRICAL ENERGY STORAGE DEVICES AND METHOD OF MAKING SAME

CROSS-REFERENCE TO RELATED APPLICATIONS

This application relates to and claims the benefit of U.S. Provisional Application No. 62/624,991, filed Feb. 1, 2018 and entitled "LITHIATION OF ELECTRODES FOR CYLINDRICAL ENERGY STORAGE DEVICES AND METHOD OF MAKING SAME," the entire disclosure of which is hereby incorporated by reference.

STATEMENT RE: FEDERALLY SPONSORED RESEARCH/DEVELOPMENT

Not Applicable

BACKGROUND

1. Technical Field

Apparatuses and methods consistent with the present inventive concept relate to energy storage devices, and more particularly to electrodes for energy storage devices.

2. Related Art

Lithium (Li) pre-doped electrodes, or lithiated electrodes, are widely used in energy storage devices, for example, lithium-ion (Li-ion) batteries and Li-ion capacitors.

In the external Li attachment and pre-dope method, an electrode pack is constructed with at least one positive electrode, at least one separator, at least one Li film laminated on a current collector, and at least one negative electrode. The negative electrode is connected to the Li film through welding of the current collector tabs. The electrode pack is immersed in electrolyte that contains Li ions. Through the pre-dope process, the Li film is converted into Li ions and the Li ions migrate and are doped into the negative electrode.

In the external Li attachment and pre-dope method, thin Li metal films are normally provided on the uppermost and lowermost layers of an electrode package. During the Li pre-dope process, the Li ions have to travel through the electrode and separator layers. One of the requirements is that the current collectors inside the electrodes needs to be in a mesh or perforation format, which is costly, and the Li may be non-uniformly doped into the stacked negative electrode layers even though the current collectors in the center of the electrodes are made porous. Long manufacture time is reported to uniformly dope lithium to the negative electrode inside the electrode laminates. Further, as Li metal is very sensitive to moisture, the entire operation of the manufacture of the electrodes attached to Li metal, the electrode packs, and the energy storage devices must be carried out in a full scale dry room, which requires high capital investment and high energy consumption. Therefore, the long manufacture cycle time plus the dry room operation requirements, makes this high cost method less competitive in the energy storage device industry.

In order to improve the long manufacture time and high cost necessary for the external Li attachment and pre-dope method, direct contact methods were proposed by different inventors as described, for example, in U.S. Patent Application Pub. No. 2017/0062815, the entire contents of which is incorporated by reference herein. In the direct contact methods, Li powder or Li film with patterns were pressed directly onto the electrode surface layer. The direct contact methods largely shortened the Li pre-dope time. However, Li metal powder or foils may remain on the electrode surface after completion of the pre-doping process, which again presents a high safety issue for the energy storage devices. More detrimentally, instantaneous electrical shorting between the Li metal and the negative electrode active layer materials (i.e., the surface of the electrode) induced by immersing the electrode pack into electrolyte caused severe reactions. These severe reactions resulted in damage to the electrode and separator, resulting in sub-par batteries and capacitors. Further, the direct contact method still requires the whole manufacture process being carried out in a full scale dry room environment, which again, requires high capital investment and high energy consumption in operations.

In order to reduce the energy storage device manufacture time and cost, to eliminate the need for expensive full scale dry room operations, and to prevent the damage caused to the electrode by direct contact, new lithiation methods to produce Li pre-doped electrodes for energy storage devices have been newly developed as set forth herein.

SUMMARY

Various embodiments provide lithiated or pre-doped electrodes and methods for fabricating lithiated or pre-doped electrodes. Lithiation can be introduced to the electrode at the different assembly stages of a cylindrical energy storage device.

Steps and corresponding stages of a typical large scale energy storage device assembly process are listed below:
1. Prepare an electrode in a roll to roll format (Stage 1)
2. Prepare an electrode pack: wind the jellyroll (Stage 2)
3. Connect the jellyroll to a lid
4. Insert the jellyroll into a can, the cell assembly (Stage 3)
5. Vacuum dry the cell assembly
6. Impregnation of the electrolyte
7. Seal the lid to the can According to various embodiments there is provided a method for lithiation, or Li pre-doping, of an electrode. In some embodiments, the method may include a Step 1 of preparing a roll with an electrode to be lithiated. The roll may consist of a single electrode (i.e. a Stage 1 roll also referred to as an electrode roll). Alternatively, the roll may consist of an electrode pack, e.g. a jellyroll, consisting of at least one negative electrode, at least one separator, and at least one positive electrode (i.e. a Stage 2 roll also referred to as an electrode pack). Alternatively, the roll may consist of an unfinished battery or ultracapacitor with an electrode pack, e.g. a jellyroll, inside a case and with or without an unsealed lid (i.e. a Stage 3 roll also referred to as a cell assembly). Step 1 may include preparing the roll in a normal air environment, drying the roll in a vacuum oven, and moving the roll into a dry box or a small dry room. The method may further include a Step 2 of preparing a piece of Li metal with predetermined weight separately in the dry box or the small dry room and, optionally, attaching the piece of Li metal to a conductive material with high conductivity, such as copper or nickel foil. The method may further include a Step 3 of attaching the piece of Li metal or the conductive material to a current collector of the electrode to be lithiated or to a metal tab connected to or from a current collector of the electrode to be lithiated, a Step 4 of placing at least one roll into a container, and a Step 5 of filling the container with electrolyte containing Li salts. The order of the steps can be changed. For example, Step 4 and Step 5 can be reversed. The Li metal may be located anywhere in relation to the roll. In some embodiments, the container inner wall may be made conductive and the lithium metal can be attached on or be a part of the inner wall. In that case, Steps 3 and 4 can be reversed.

In the case of lithiation of the Stage 3 roll, i.e. the cell assembly, one of the options is that the cell packaging case containing the jellyroll or other electrode pack, also referred to as the "can" of the cell assembly, may itself serve as the container of Steps 4 and 5. The most significant advantage of this approach is that the large dry room for the electrode preparation and the cell manufacture is not needed. Lithium is not introduced during the processes of preparing the electrode or electrode pack, e.g. jellyroll. It is introduced only during the later steps of the cell assembly.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Various embodiments provide a lithiation method for producing Li pre-doped electrodes. The lithiation method may reduce the manufacture time and cost compared to the conventional Li attachment and pre-dope methods, and may further prevent electrode and separator damage caused during the pre-dope process in the direct contact methods. In some cases, it may reduce, minimize or eliminate the usage of a production scale dry room. The lithiated electrodes may be incorporated into energy storage devices, for example, but not limited to, lithium-ion batteries, lithium-ion capacitors, etc.

Figure 1:
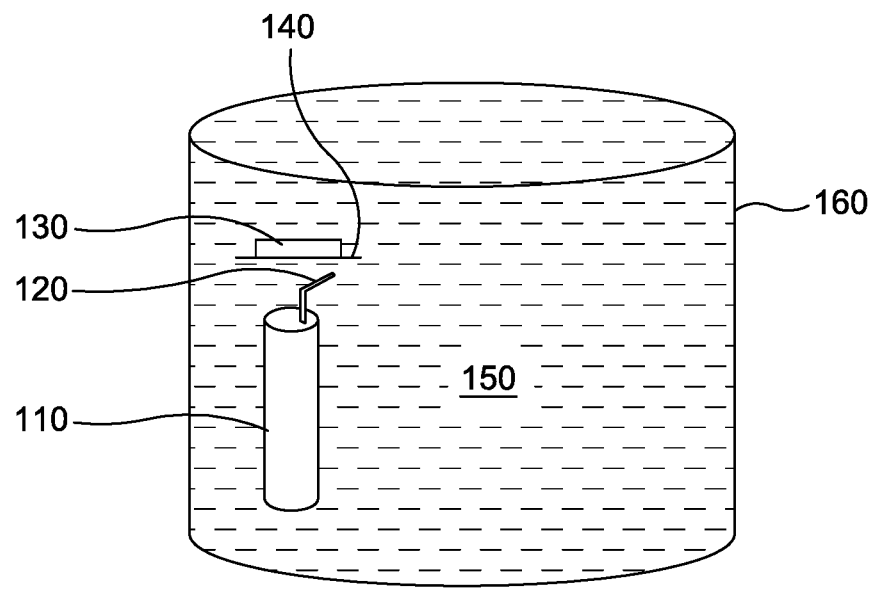
FIG. 1 is a diagram illustrating a roll 110 with a metal tab 120 connected to or from a current collector 117b (see FIG. 3) of an electrode to be lithiated. A piece of Li metal 130 with predetermined weight, attached to a conductive material 140 with high conductivity, such as copper or nickel foil, is attached to the metal tab 120 or directly to the current collector 117b (in which case the metal tab 120 may be omitted) of the roll 110. The roll 110 with optional metal tab 120 and the piece of Li metal 130 with conductive material 140 are placed inside a container 160 filled with electrolytes 150 according to various embodiments. One roll 110 with metal tab 120 may be connected to one or more pieces of Li metal 130 with conductive material(s) 140. Conversely, one piece of Li metal 130, optionally with conductive material 140, may be connected to one or more rolls 110 with metal tab(s) 120. Alternatively, the piece of Li metal 130 with predetermined weight can be attached to the metal tab 120 of the roll 110 directly, without being attached to a conductive material 140.
Figure 2:
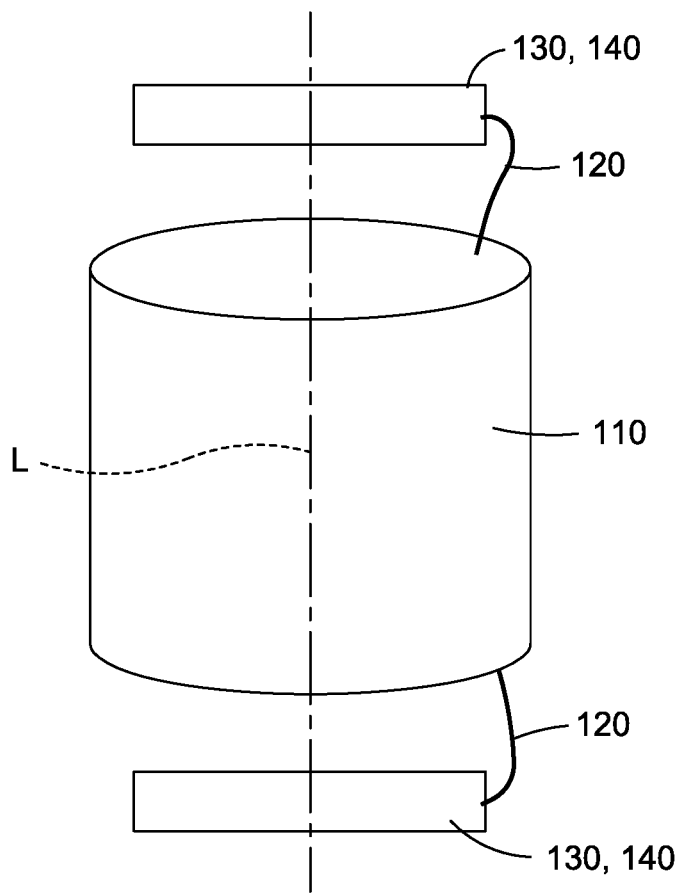
FIG. 2 is a diagram illustrating a roll 110 with a metal tab 120 connected to or from a current collector 117b (see FIG. 3) of an electrode to be lithiated. A piece of Li metal 130 with predetermined weight, attached to a conductive material 140 with high conductivity, such as copper or nickel, is attached to the metal tab 120 or directly to the current collector 117b (in which case the metal tab 120 may be omitted) of the roll 110. The piece of Li metal 130 with attached conductive material 140 can be placed anywhere in relation to the roll 110 as the metal tab 120 or current collector 117b allows. However, for a faster lithiation process, the piece of Li metal 130 with attached conductive material 140 should be placed as close to the roll 110 as possible, preferably above or below the roll 110 (e.g. on a longitudinal axis L of a cylindrical jellyroll as shown). One roll 110 with optional metal tab 120 may be connected to one or more pieces of Li metal 130 with conductive material(s) 140. Conversely, one piece of Li metal 130, optionally with conductive material 140, may be connected to one or more rolls 110 with metal tab(s) 120. Alternatively, the piece of Li metal 130 with predetermined weight can be attached to the metal tab 120 of the roll 110 directly, without being attached to a conductive material 140. The metal tab 120 or current collector 117b may be attached either to the piece of Li metal 130 or a conductive material 140 attached to the piece of Li metal 130. Thus, the element labeled "130, 140" in FIG. 2 may be either or both of the piece of Li metal 130 and the conductive material 140.
Figure 3:
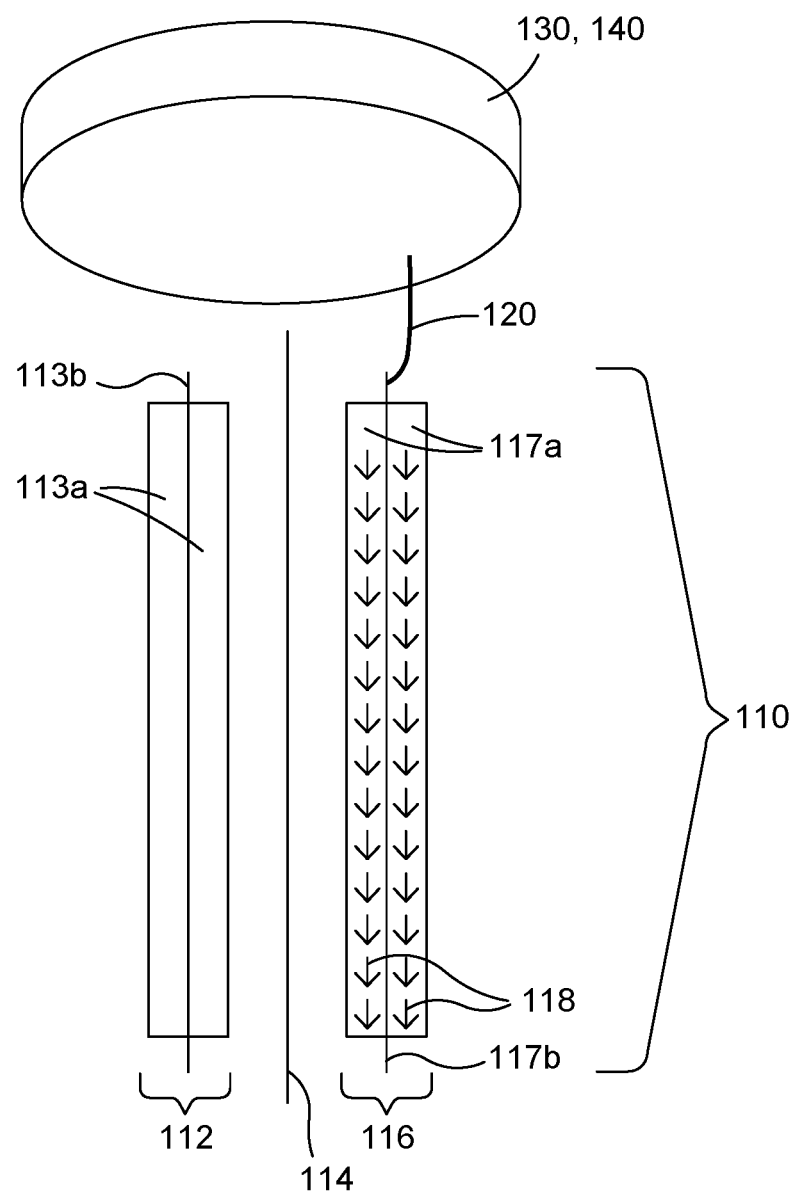
FIG. 3 is a diagram illustrating a Stage 2 roll 110 consisting of a positive electrode 112, a separator 114, and a negative electrode 116. A piece of Li metal 130 with predetermined weight, attached to a conductive material 140 with high conductivity, such as copper or nickel, is attached to the metal tab 120 or directly to the current collector 117b (in which case the metal tab 120 may be omitted) of the roll 110. The piece of Li metal 130 and/or conductive material 140 is placed above or below the roll 110. Therefore, the lithiation paths 118 are along the surfaces of the negative electrode active layers 117a. As such, Li ions don't need to pass through the electrode 116, and a low cost solid metal foil can be used as the current collector 117b inside the electrode 116. Again, one roll 110 with optional metal tab 120 may be connected to one or more pieces of Li metal 130 with conductive material(s) 140. Conversely, one piece of Li metal 130, optionally with conductive material 140, may be connected to one or more rolls 110 with metal tab(s) 120. Alternatively, the piece of Li metal 130 with predetermined weight can be attached to the metal tab 120 or current collector 117b of the roll 110 directly, without being attached to a conductive material 140.
Figure 4:
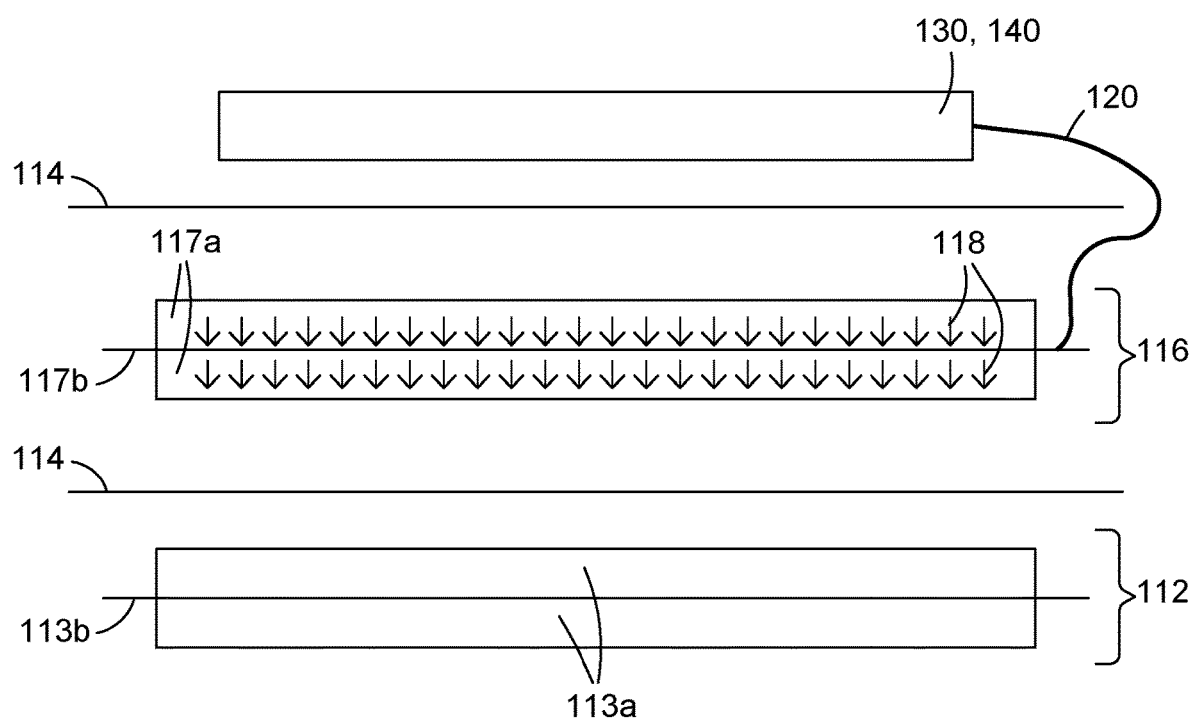
FIG. 4 is another diagram illustrating the Stage 2 roll 110 of FIG. 3, consisting of the positive electrode 112, separator 114, and negative electrode 116, along with another separator 114. As in FIG. 3, the piece of Li metal 130 with predetermined weight, attached to the conductive material 140 with high conductivity, such as copper or nickel, is attached to the metal tab 120 or directly to the current collector 117b (in which case the metal tab 120 may be omitted) of the roll 110. However, in the example of FIG. 4, the piece of Li metal 130 with conductive material 140 is placed not above or below the roll 110 but to the side of the roll 110 (e.g. off the longitudinal axis L of FIG. 2). Therefore, the lithiation paths 118 are perpendicular to the surfaces of the negative electrode active layers 117a. As such, Li ions need to pass through the electrode 116, and a high cost mesh type metal foil or a high cost perforated metal foil must be used as the current collector 117b inside the electrode 116. If a solid metal foil is used inside the electrode 116 as the current collector 117b, the electrode 116 must be perforated before making the Stage 2 roll 110. Again, one roll 110 with optional metal tab 120 may be connected to one or more pieces of Li metal 130 with conductive material(s) 140. Conversely, one piece of Li metal 130, optionally with conductive material 140, may be connected to one or more rolls 110 with metal tab(s) 120. Alternatively, the piece of Li metal 130 with predetermined weight can be attached to the metal tab 120 or current collector 117b of the roll 110 directly, without being attached to a conductive material 140.

FIG. 1 is a diagram illustrating a view of a roll 110 with a metal tab 120, a piece of lithium 130, electrolyte 150, and a container 160 according to various example embodiments. Referring to FIG. 1, at least one metal tab 120 of the roll 110 may come from or be connected to a current collector 117b (see FIG. 3) of the electrode to be lithiated. The roll 110 may consist of a single electrode (i.e. a Stage 1 roll also referred to as an electrode roll); or a jellyroll consisting of at least one negative electrode 116, one separator 114, and one positive electrode 112 as shown in FIGS. 3 and 4 (Stage 2 roll also referred to as an electrode pack); or an unfinished battery or ultracapacitor with an electrode pack inside and with a case and with or without an unsealed lid (Stage 3 roll also referred to as a cell assembly).

The piece of lithium metal 130 may be attached to a conductive material 140 with high conductivity such as a piece of copper or nickel foil. Alternatively, the piece of Lithium metal 130 may not be attached to a conductive material 140.

The roll 110 and the piece of Li metal 130 are connected to each other through the metal tab 120 or directly through the current collector 117b (in which case the metal tab 120 may be omitted) of the roll 110 and the conductive material 140 attached to the piece of Li metal 130. Alternatively, if there is only a piece of Lithium metal 130 and no attached conductive material 140, the piece of Lithium metal 130 can be attached to the metal tab 120 or current collector 117b of the roll 110 directly. The piece of Li metal 130 and optional conductive material 140 can be located anywhere relative to the roll 110, within the bounds and flexibility of the metal tab 120 or current collector 117b. This includes the piece of Li metal 130 and optional conductive material 140 being above, next to, or below the roll 110. However, for a fast lithiation process, the piece of Li metal 130 and optional conductive material 140 should be placed as close to the roll 110 as possible, preferably on the top or at the bottom of the roll 110 (e.g. on a longitudinal axis L of a cylindrical jellyroll), as shown in 2 and 3, where the lithiation paths 118 are along the surfaces of the negative electrode active layers 117a. Another relative location of the piece of Li metal 130 and optional conductive material 140 to the roll 110 is shown in FIG. 4, where the lithiation paths 118 are vertical to the roll 110, thus requiring a high cost mesh type metal foil or a high cost perforated metal foil to be used as the current collector 117b inside the negative electrode 116. Or, alternatively, if a solid metal foil is used inside the negative electrode 116 as the current collector 117b, the negative electrode 116 may be perforated before making the Stage 2 roll 110.

Figure 5:
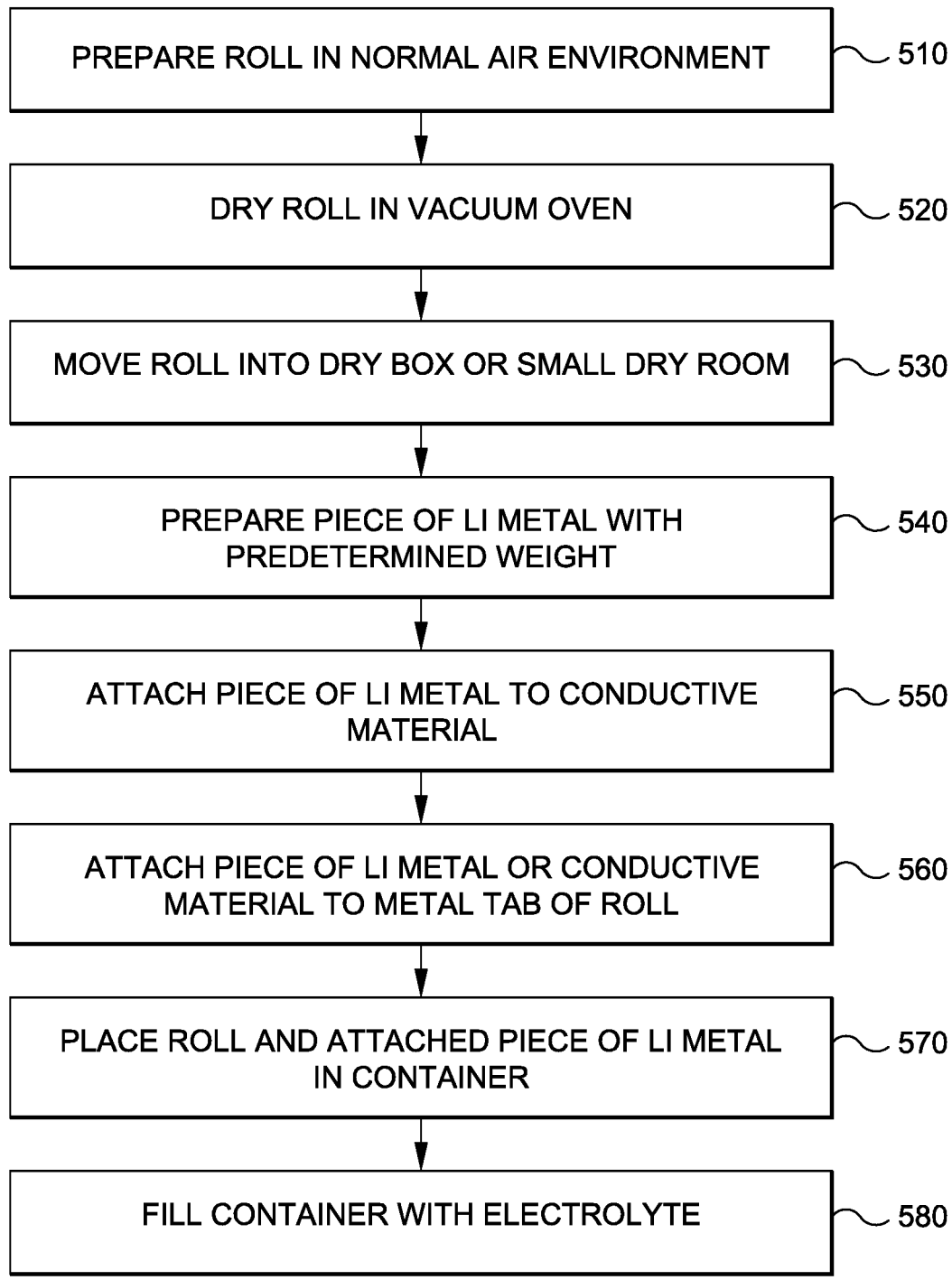
FIG. 5 shows an example operational flow of a lithiation method for producing Li pre-doped electrodes.

FIG. 5 shows an example operational flow of a lithiation method for producing Li pre-doped electrodes. The operational flow may begin with preparing the roll 110 in a normal air environment (step 510), drying the roll 110 in a vacuum oven (step 520), and moving the roll 110 into a dry box or small dry room (step 530). The roll 110 may consist of a single electrode such as the negative electrode 116 (i.e. a Stage 1 roll also referred to as an electrode roll). Alternatively, the roll 110 may consist of an electrode pack, e.g. a jellyroll, consisting of at least one negative electrode 116, at least one separator 114, and at least one positive electrode 112 (i.e. a Stage 2 roll also referred to as an electrode pack). Alternatively, the roll 110 may consist of an unfinished battery or ultracapacitor with an electrode pack, e.g. a jellyroll, inside a case and with or without an unsealed lid (i.e. a Stage 3 roll also referred to as a cell assembly). In any case, at least one metal tab 120 may be connected to or from the negative electrode 116 to be lithiated (e.g. connected to or from a current collector 117b thereof).

The operational flow may continue with preparing the piece of Li metal 130 with predetermined weight separately in the dry box or the small dry room (step 540) and, optionally, attaching the piece of Li metal 130 to a conductive material 140 with high conductivity, such as copper or nickel foil (Step 550), for example, by mechanical press. The piece of Li metal 130 or, optionally, the conductive material 140 attached thereto, may then be attached to the metal tab 120 or directly to the current collector 117b of the roll 110 (step 560), that is, the metal tab 120 or current collector 117b of the negative electrode 160 to be lithiated (or metal tab 120 or current collector 113b of positive electrode 112 to be lithiated), for example, by welding (e.g. laser welding, ultrasonic welding, cold welding). In this way, a single roll 110, optionally with metal tab 120, may be connected to one or more pieces of lithium metal 130. Conversely, a single piece of lithium metal 130 may be attached to one or more rolls 110 with metal tab(s) 120.

The operational flow may further include placing at least one roll 110 and piece of Li metal 130 in the container 160 (step 570) and filling the container 160 with electrolyte 150 containing Li salts (step 580). The electrolyte 150 may be reusable during a process of lithiating multiple electrodes. The order of the steps is not limited to the example shown in FIG. 5. For example, steps 570 and 580 can be reversed, with the container 160 first being filled with the electrolyte 150 and thereafter the roll(s) 110 and piece(s) of Li metal 130 being placed in the container 160. The container 160 is a container for holding the electrolyte 150. Lithiation or pre-doping may begin immediately after the roll(s) 110 and. Li metal 130 (with optional conductive material) are connected (via metal tab(s) 120 or directly via current connector(s) 117b) and placed inside the electrolyte 150 in the container 160.

The Li metal 130 may be located anywhere in relation to the roll 110 as described above. In some embodiments, the inner wall of the container 160 may be made conductive and serve as the conductive material 140 and the piece of Li metal 130 can be installed on or be a part of the inner wall of the container 160. In that case, steps 560 and 570 can be reversed or occur substantially simultaneously, as the roll 110 is placed inside the container 160 and attached to the inner wall thereof.

The container 160 of electrolyte 150 may contain one or more multiple rolls 110 with optional metal tab(s) 120 and may contain one or more multiple pieces of Li metal 130 with optional conductive material(s) 140. When the lithiation or pre-doping process is finished, the roll(s) with metal tab(s) 120 may be removed from the container 160.

In the case of lithiation of a Stage 3 roll consisting of a cell assembly, one of the options is that the cell packaging case, i.e. the can, outside of the electrode pack may itself serve as the container 160. In this situation, the electrode pack, e.g. jellyroll, inside the can, may be regarded as the roll 110, and a piece of Li metal 130 (and optional conductive material 140) may be connected to the electrode pack and inserted into the can serving as the container 160. The can may then be filled with the electrolyte 150 to begin the lithiation or pre-doping process. In this case, excess Li metal 130 may be removed from the can serving as the container 160 when the lithiation is complete. The most significant advantage of this approach is that the large dry room for the electrode preparation and the cell manufacture is not needed. Lithium is not introduced during the electrode or electrode pack preparation process. It is introduced only during the late steps of the cell assembly.

This lithiation methods disclosed herein may need a longer lithiation time than the direct contact method. However, the disclosed methods may prevent the electrode, separator and cell damage caused by the shorting and strong reactions between the Li metal and the electrode being lithiated. The method disclosed herein also provides lithiation paths along the electrode surfaces such that a low cost solid current collector can be used inside the electrodes.

Depending on whether a Stage 1, Stage 2, or Stage 3 roll 110 is to be lithiated, the assembly of the electrodes or electrode packs (e.g. jellyrolls) or complete energy storage devices, such as battery and Ultracapacitor, can be conducted in a normal air environment before the Li metal 130 is introduced and connected to the rolls 110. Thus, in the case of a Stage 2 or Stage 3 roll 110, the dry room size requirements may be reduced. For Stage 3 roll lithiation, no dry room is necessary, since the lithium is introduced only at the last steps of cell assembly. After the electrodes, electrode packs (e.g. jellyrolls), or energy storage devices are prepared, the rolls 110 can be dried and moved into a dry box or a small dry room and then connected to the piece of Li metal 130 and immersed in a container 160 filled with electrolytes 150 containing Li salts. This eliminates the need for a full scale dry room, which can be very expensive to build, maintain, and operate.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for lithiation of an electrode for use in an energy storage device, the method comprising:
    providing a roll including a negative electrode, at least one separator, and a positive electrode, the negative electrode or the positive electrode being an electrode to be lithiated, the roll being disposed in and electrically connected to a cell packaging case;
    providing a piece of lithium metal with predetermined weight;
    attaching the piece of lithium metal to a conductive material;
    inserting the conductive material and the piece of lithium metal into the cell packaging case;
    attaching the conductive material with the piece of lithium metal to an inner wall of the cell packaging case; and,
    after said attaching the conductive material with the piece of lithium metal to the inner wall of the cell packaging case, and with the roll being disposed in and electrically connected to the cell packaging case, filling the cell packaging case with an electrolyte containing a lithium salt.

2. The method of claim 1, further comprising assembling the roll without a dry box or dry room.

3. A method for lithiation of an electrode for use in an energy storage device, the method comprising:
    providing a roll including a negative electrode, at least one separator, and a positive electrode, the negative electrode or the positive electrode being an electrode to be lithiated, the roll being disposed in a cell packaging case;
    providing a piece of lithium metal with predetermined weight;
    inserting the piece of lithium metal into the cell packaging case;
    attaching the piece of lithium metal to a current collector of the electrode to be lithiated or to a metal tab connected to or from a current collector of the electrode to be lithiated; and,
    after said attaching, and with the roll being disposed in the cell packaging case, filling the cell packaging case with an electrolyte containing a lithium salt.

4. The method of claim 3, further comprising assembling the roll without a dry box or dry room.

5. The method of claim 1, wherein said attaching includes positioning the conductive material above or below the roll.

6. The method of claim 5, wherein said attaching includes positioning the conductive material on a longitudinal axis of the roll.

7. The method of claim 1, wherein the electrode to be lithiated includes a current collector formed from a solid metal foil.

8. The method of claim 1, further comprising, after lithiation of the electrode to be lithiated, removing the conductive material and the remains of the piece of lithium metal on the conductive material from the cell packaging case.

9. The method of claim 3, further comprising positioning the piece of lithium metal above or below the roll.

10. The method of claim 9, further comprising positioning the piece of lithium metal on a longitudinal axis of the roll.

11. The method of claim 3, wherein the current collector is formed from a solid metal foil.

12. The method of claim 3, wherein the attaching includes attaching the piece of lithium metal to the current collector or to the metal tab via a conductive path that does not include the cell packaging case.

13. The method of claim 3, further comprising, after lithiation of the electrode to be lithiated, removing the remains of the piece of lithium metal from the cell packaging case.

* * * * *